US012562645B2

(12) United States Patent　　(10) Patent No.: US 12,562,645 B2
Satti et al.　　(45) Date of Patent: Feb. 24, 2026

(54) RINGING CONTROL CIRCUITS

(71) Applicant: TEXAS INSTRUMENTS INCORPORATED, Dallas, TX (US)

(72) Inventors: Saqib Satti, Freising (DE); Qiao Yang, Munich (DE); Stefan Herzer, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 426 days.

(21) Appl. No.: 18/161,924

(22) Filed: Jan. 31, 2023

(65) Prior Publication Data

US 2024/0258917 A1　　Aug. 1, 2024

(51) Int. Cl.
　　*H02M 3/158*　　(2006.01)
　　*H02M 1/14*　　(2006.01)
　　*H02M 1/32*　　(2007.01)
(52) U.S. Cl.
　　CPC ........... *H02M 3/158* (2013.01); *H02M 1/143* (2013.01); *H02M 1/325* (2021.05)

(58) Field of Classification Search
　　CPC ....... H02M 3/158; H02M 1/325; H02M 1/143
　　See application file for complete search history.

(56) References Cited

U.S. PATENT DOCUMENTS

| | | | | |
|---|---|---|---|---|
| 4,234,762 | A * | 11/1980 | Bosik | ................... H04M 19/026 |
| | | | | 379/382 |
| 7,409,305 | B1 * | 8/2008 | Carpenter | ........ G01R 31/31725 |
| | | | | 702/183 |
| 2006/0044718 | A1 * | 3/2006 | Su | ........................ H10D 89/921 |
| | | | | 361/56 |

* cited by examiner

*Primary Examiner* — Rafael O De Leon Domenech
(74) *Attorney, Agent, or Firm* — Zhenhai Fu; Frank D. Cimino

(57)　　　ABSTRACT

A circuit includes a transistor and a ringing control circuit. The transistor is coupled between an input voltage terminal and a switching terminal. The transistor includes a control terminal. The ringing control circuit has a control input and a control output. The control input is coupled to the switching terminal, and the control output is coupled to the control terminal.

20 Claims, 7 Drawing Sheets

RINGING CONTROL CIRCUITS

BACKGROUND

A DC-DC converter is an electronic circuit that converts an input direct current (DC) voltage into one or more DC output voltages that are higher or lower in magnitude than the input DC voltage. A DC-DC converter that generates an output voltage lower than the input voltage is termed a buck or step-down converter. A DC-DC converter that generates an output voltage higher than the input voltage is termed a boost or step-up converter.

Some DC-DC converter topologies include a drive/power switch coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. DC-DC converters are widely used in electronic devices, particularly battery powered devices, such as portable cellular phones, laptop computers, and other electronic systems in which efficient use of power is desirable.

SUMMARY

In one example, a circuit includes a transistor and a ringing control circuit. The transistor is coupled between an input voltage terminal and a switching terminal. The transistor includes a control terminal. The ringing control circuit has a control input and a control output. The control input is coupled to the switching terminal, and the control output is coupled to the control terminal.

In another example, a circuit includes a transistor and a ringing control circuit. The transistor is coupled between a switching terminal and a ground terminal. The transistor has a control terminal. The ringing control circuit has a control input and a control output. The control input is coupled to an input voltage terminal, and the control output is coupled to the control terminal.

In a further example, a circuit includes a high-side transistor, a low-side transistor, a high-side driver, a low-side driver, a high-side ringing control circuit, and a low-side ringing control circuit. The high-side transistor is coupled between an input voltage terminal and a switching terminal. The high-side transistor including a high-side control terminal. The low-side transistor is coupled between the switching terminal and a ground terminal. The low-side transistor includes a low-side control terminal. The high-side driver has a high-side input and a high-side output. The high-side input is coupled to a first PWM terminal and the high-side output is coupled to the high-side control terminal. The low-side driver has a low-side input and a low-side output. The low-side input is coupled to a second PWM terminal and the low-side output is coupled to the low-side control terminal. The high-side ringing control circuit has a high-side ringing control input and a high-side ringing control output. The high-side ringing control input is coupled to the switching terminal, and the high-side ringing control output is coupled to the high-side control terminal. The low-side ringing control circuit has a low-side ringing control input and a low-side ringing control output. The low-side ringing control input is coupled to the input voltage terminal, and the low-side ringing control output is coupled to the low-side control terminal.

BRIEF DESCRIPTION OF THE DRAWINGS

The same reference numbers or other reference designators are used in the drawings to designate the same or similar (either by function and/or structure) features.

DETAILED DESCRIPTION

Figure 1:
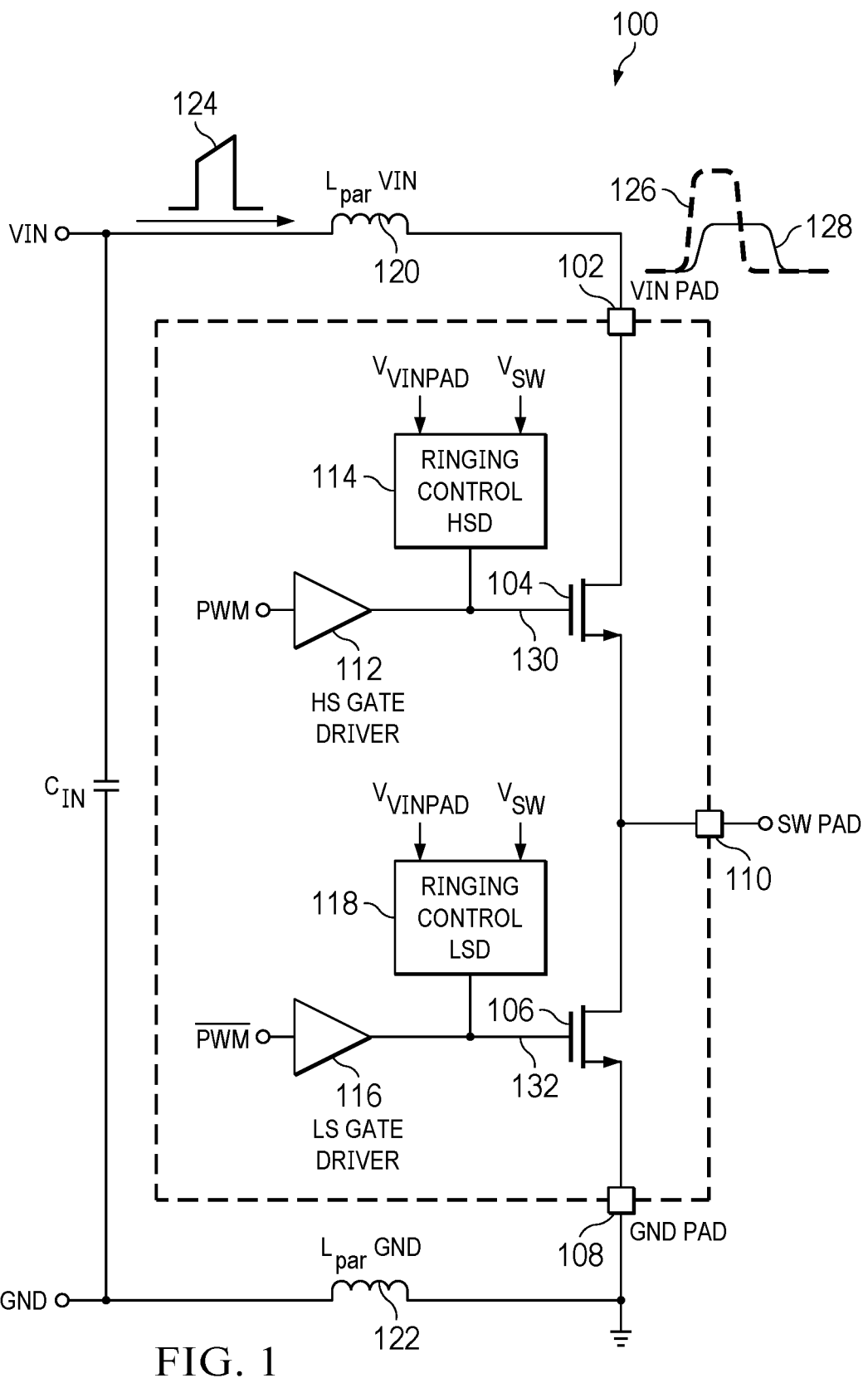
FIG. 1 is a schematic of an example DC-DC converter circuit that includes ringing control circuits.

FIG. 1 is a schematic of an example DC-DC converter circuit 100. The DC-DC converter circuit 100 includes a power terminal 102, a high-side transistor 104, a low-side transistor 106, a ground terminal 108, a switching terminal 110, a high-side driver 112, a high-side ringing control circuit 114, a low-side driver 116, and a low-side ringing control circuit 118. The DC-DC converter circuit 100 is illustrated as a step-down (buck) converter, but some examples of the DC-DC converter circuit 100 can be a different type of converter (e.g., buck-boost converter). The high-side driver 112 controls switching of the high-side transistor 104, and the low-side driver 116 controls switching of the low-side transistor 106. A driver input of the high-side driver 112 is coupled to a first output of a pulse width modulation (PWM) circuit (not shown) or a first PWM terminal, and a driver output of the high-side driver 112 is coupled to a control terminal (e.g., gate) of the high-side transistor 104. A driver input of the low-side driver 116 is coupled to a second output of the PWM circuit or a second PWM terminal, and a driver output of the low-side driver 116 is coupled to a control terminal (e.g., gate) of the low-side transistor 106. The high-side transistor 104 and the low-side transistor 106 can be n-channel field effect transistors (NFETs).

A first current terminal (e.g., drain) of the high-side transistor 104 is coupled to the power terminal 102. A second current terminal (e.g., source) of the high-side transistor 104 is coupled to the switching terminal 110. A first current terminal of the low-side transistor 106 (e.g., drain) is coupled to the switching terminal 110. A second current terminal (e.g., source) of the low-side transistor 106 is coupled to the ground terminal 108. An inductor (not shown) can be coupled to the switching terminal 110 for charging and discharging by switching of the high-side transistor 104 and the low-side transistor 106. The high-side driver 112 turns on the high-side transistor 104 and the low-side driver 116 turns off the low-side transistor 106 to charge the inductor coupled to the switching terminal 110. The low-side driver 116 turns on the low-side transistor 106 and the high-side driver 112 turns off the high-side transistor 104 to discharge the inductor coupled to the switching terminal 110.

Conductors (e.g., printed circuit board traces, bond wires, etc.) coupled to the power terminal 102 can include a parasitic inductance 120, and conductors coupled to the ground terminal 108 can include a parasitic inductance 122. The switching of the high-side transistor 104 and the low-side transistor 106 charge and discharge these parasitic inductances. When the high-side transistor 104 is turned off and the low-side transistor 106 is turned on, current flow through the power terminal 102 stops abruptly, and the voltage at the power terminal 102 increases and generates an overshoot 126. The magnitude of the overshoot 126 can be based on parasitic inductance 120 and the rate of change of the current flow $$\left( V = L\frac{di}{dt} \right).$$

The overshoot 126 can cause the voltage across the high-side transistor 104 to exceed a maximum safe operating voltage. The low-side transistor 106 is subject to similar overshoot (and potential damage) when the low-side transistor 106 is turned off. The voltage stress can damage or otherwise reduce the life time of the high-side transistor 104 and the low-side transistor 106, and degrade the reliability of the DC-DC converter circuit 100.

The high-side ringing control circuit 114 senses overshoot at the power terminal 102 and delays the turn-off of the high-side transistor 104 to reduce the amplitude of the overshoot, represented by the clamped overshoot 128 of FIG. 1. The high-side ringing control circuit 114 can include a first control input coupled to the power terminal 102, a second control input coupled to the switching terminal 110, and a control output coupled to the control terminal of the high-side transistor 104. The high-side ringing control circuit 114 receives the voltages at the power terminal 102 and the switching terminal 110, and provides an output signal 130 that delays the turn-off the high-side transistor 104. Accordingly, a current path through the high-side transistor 104 and the low-side transistor 106 can be enabled to discharge the power terminal 102 and reduce the amplitude of the overshoot.

Similarly, the low-side ringing control circuit 118 senses an increase in voltage across the low-side transistor 106 (or an increase in the voltage on the power terminal 102) and provides an output signal 132 that turns on the low-side transistor 106 to reduce the amplitude of transient voltage across the low-side transistor 106. The low-side ringing control circuit 118 includes a first control input coupled to the power terminal 102 and a control output coupled to the control terminal of the low-side transistor 106. Some examples of the low-side ringing control circuit 118 can also include a second control input coupled to the switching terminal 110. The low-side ringing control circuit 118 receives the voltages at the power terminal 102 and/or the switching terminal 110, and provides, based on at least one of these voltages, the output signal 132 that turns-on the low-side transistor 106. Accordingly, a current path through the high-side transistor 104 and the low-side transistor 106 can be enabled to discharge the power terminal 102 and reduce the amplitude of the overshoot.

The ringing control circuits 114 and 118 can delay the turn off the respective high-side transistor 104 and low-side transistor 108 to provide a current path to discharge the power terminal 102, which can reduce the overshoot and the voltage across the respective high-side transistor 104 and low-side transistor 108 caused by the overshoot. Such arrangements can reduce the voltage stress on the high-side transistor 104 and low-side transistor 108 due to the overshoot and improve reliability. Also, the DC-DC converter circuit 100 does not need to include a separate device to provide the current path to discharge the power terminal 102, which can reduce the footprint of the DC-DC converter circuit 100.

Figure 2:
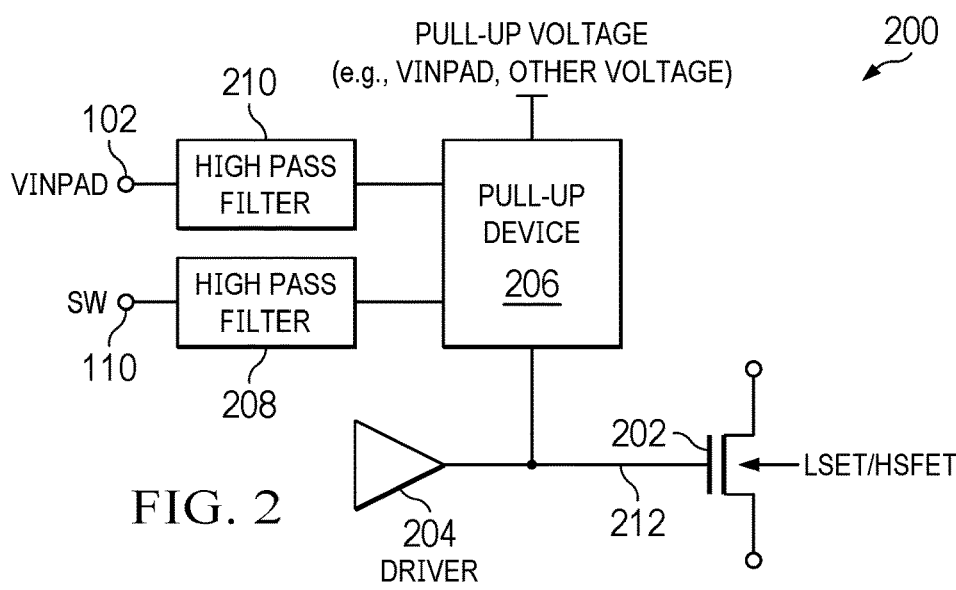
FIG. 2 is a block diagram of an example ringing control circuit that can be part of the DC-DC converter circuit of FIG. 1.

FIG. 2 is a block diagram of an example ringing control circuit 200 that can be part of the DC-DC converter circuit 100. The ringing control circuit 200 can be part of the high-side ringing control circuit 114. The ringing control circuit 200 can also be part of the low-side ringing control circuit 118. The transistor 202 can be the high-side transistor 104 or the low-side transistor 106 of the DC-DC converter circuit 100. The driver 204 can be the high-side driver 112 or the low-side driver 116 of the DC-DC converter circuit 100. The pull-up device 206 is coupled between a control terminal (e.g., gate) of the transistor 202 and a pull-up voltage source, such as the power terminal 102 or other voltage source). The pull-up device 206 provides a current at an output to pull-up the control terminal of the transistor 202 and turns on (or delays the turn-off of) the transistor 202.

A high-pass filter 208 is coupled between the switching terminal 110 and an input of the pull-up device 206. A transient (e.g., a high-to-low edge caused by turning on the low-side transistor 106) passes through the high-pass filter 208 to the pull-up device 206, and causes the pull-up device 206 to provide a current to the control terminal of the transistor 202. The current provided by the pull-up device 206 turns on (or delays the turn-off of) the transistor 202 to reduce the voltage across the transistor 202.

A high-pass filter 210 is coupled between the power terminal 102 and an input of the pull-up device 206. A transient (e.g., a low-to-high edge caused by turning off the high-side transistor 104) passes through the high-pass filter 210 to the pull-up device 206, and causes the pull-up device 206 to provide a signal 212 that increases the voltage of the control terminal of the transistor 202. The increased control terminal voltage turns on (or delays the turn-off of) the transistor 202, which reduces the voltage across the transistor 202.

Figure 3:
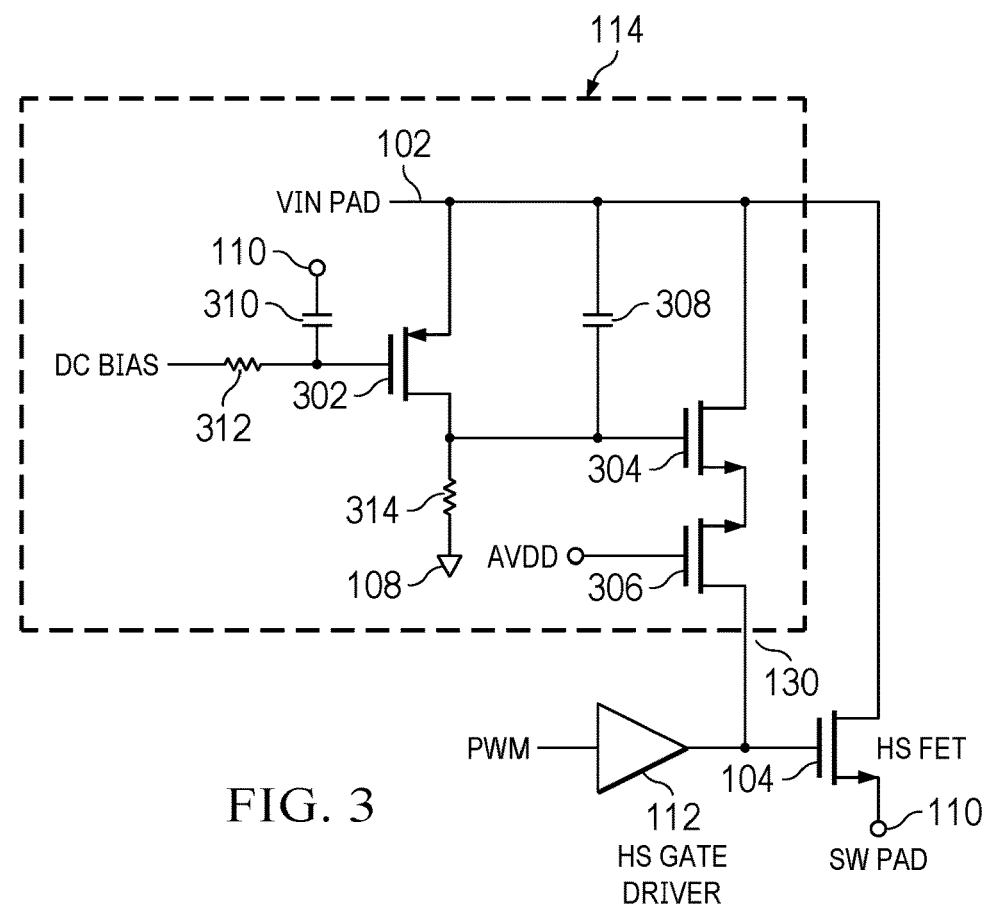
FIGS. 3 and 4 are schematics of example high-side ringing control circuits of FIG. 2.

FIG. 3 is a schematic of example internal components of the example high-side ringing control circuit 114. The high-side ringing control circuit 114 includes a transistor 302, a transistor 304, a transistor 306, a capacitor 308, a capacitor 310, a resistor 312, and a resistor 314. The transistor 304 is coupled between the power terminal 102 and the control terminal of the high-side transistor 104. The transistor 304 can be an NFET. The transistor 304 can be an example of the pull-up device 206 (FIG. 2). Current flowing through the transistor 304 can charge and increase the voltage of the control terminal of the high-side transistor 104, which can delay the turn-off of the high-side transistor 104. A first current terminal (e.g., drain) of the transistor 304 is coupled to the power terminal 102. A second current terminal (e.g., source) of the transistor 304 is coupled to the control terminal of the high-side transistor 104 via the transistor 306.

The transistor 306 is coupled between the transistor 304 and the control terminal of the high-side transistor 104. The transistor 306 can be an NFET. A first current terminal (e.g., source) of the transistor 306 is coupled to the second current terminal of the transistor 304, and the second current terminal (e.g., drain) of the transistor 306 is coupled to the control terminal of the high-side transistor 104. A control terminal (e.g., gate) of the transistor 306 can be coupled to a bias voltage source (e.g., an analog power supply voltage AVDD). The body diode of the transistor 306 can block current flow from the control terminal of the high-side transistor 104 back to the power terminal 102. In some examples, the transistor 306 can be replaced by a diode. In some examples, the transistor 306 can be coupled between the transistor 304 and the power terminal 102.

The capacitor 308 and the resistor 314 form a first high-pass filter (e.g., the high-pass filter 210) coupled between the power terminal 102 and the control terminal (e.g., gate) of the transistor 304. The capacitor 308 is coupled between the power terminal 102 and the control terminal of the transistor 304. The resistor 314 is coupled between the control terminal of the transistor 304 and the ground terminal. When the high-side transistor 104 starts to turn off, and the voltage on the power terminal 102 rises, the transient on the power terminal 102 pass through the capacitor 308 to turn on the transistor 304, which can connect the control terminal of the high-side transistor 104 to the power terminal 102 and increase the control terminal voltage of the high-side transistor 104. The increased control terminal voltage can delay the turn-off of the high-side transistor 104.

The transistor 302 is coupled between the power terminal 102 and the control terminal of the transistor 304. The transistor 302 can be a p-channel field effect transistor (PFET). The transistor 302 switches current to the control terminal of the transistor 304 responsive to a transient at the switching terminal 110. A first current terminal (e.g., source) of the transistor 302 is coupled to the power terminal 102, and a second current terminal (e.g., drain) of the transistor 302 is coupled to the control terminal of the transistor 304. The control terminal (e.g., gate) of the transistor 302 is coupled to a high-pass filter (e.g., the high-pass filter 208) formed by the capacitor 310 and the resistor 312. The capacitor 310 is coupled between the switching terminal 110 and the control terminal of the transistor 302, and the resistor 312 is coupled between the control terminal of the transistor 302 and a DC bias source.

When the voltage on the switching terminal 110 starts to fall, as the high-side transistor 104 is turned off and the low-side transistor 106 is turned on, the falling edge on the switching terminal 110 pulls down the control terminal of the transistor 302 through the capacitor 310 to turn on the transistor 302. The transistor 302 can connect power terminal 102 to the control terminal of the transistor 304 to increase the control terminal voltage of the transistor 304, which can delay the turn off of the high-side transistor 104.

On the other hand, in the absence of overshoot, the DC bias source can set the control terminal of the transistor 302 at a relatively high voltage, which turns off the transistor 302. The resistor 314 can pull down the voltage of the control terminal of the transistor 304, which turns off the transistor 304. Accordingly, the pull-up path on the control terminal of the high-side transistor 104 is disabled. This allows the high side gate driver 112 to control the high-side transistor 104 to perform the switching operations.

Some examples of the high-side ringing control circuit 114 can exclude the capacitor 308 and the resistor 314, or exclude the transistor 302, the capacitor 310, and the resistor 312.

Figure 4:
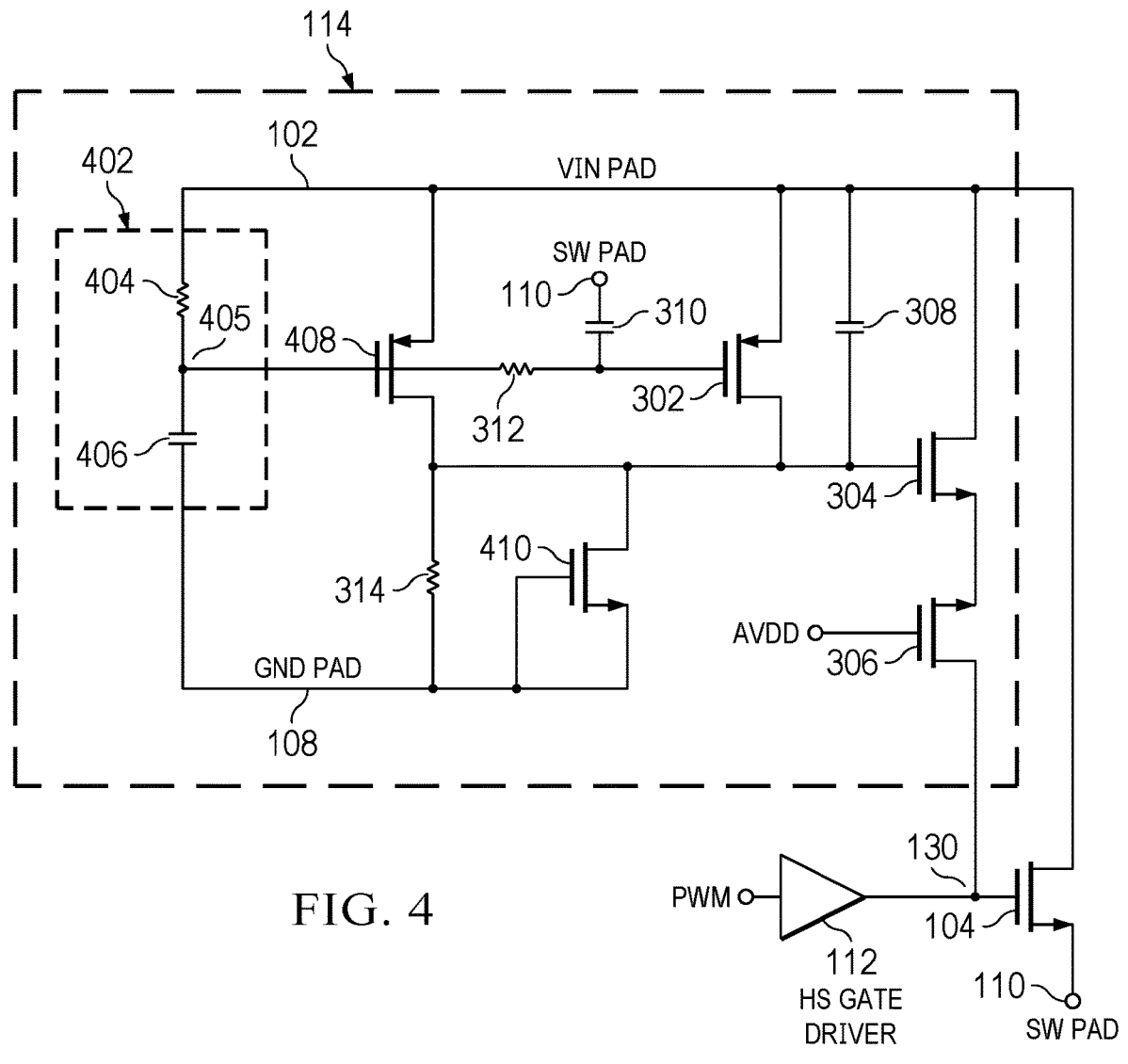

FIG. 4 is a schematic of another example high-side ringing control circuit 114 that can be used in the DC-DC converter circuit 100. The high-side ringing control circuit 114 of FIG. 4 includes the includes the transistor 302, the transistor 304, the transistor 306, the capacitor 308, the capacitor 310, the resistor 312, and the resistor 314 as described per FIG. 3. The high-side ringing control circuit 114 of FIG. 4 also includes a low-pass filter 402, a transistor 408, and a transistor 410. The low-pass filter 402 includes a resistor 404, and capacitor 406. The transistor 408 can be a PFET. The transistor 408 is coupled between the power terminal 102 and the control terminal of the transistor 304. A first current terminal (e.g., source) of the transistor 408 is coupled to the power terminal 102, and a second current terminal (e.g., drain) of the transistor 408 is coupled to the control terminal of the transistor 304. The control terminal (e.g., gate) of the transistor 408 is coupled to the node 405 of the low-pass filter 402.

The resistor 404 is coupled between the power terminal 102 and the node 405. The capacitor 406 is coupled between the node 405 and the ground terminal 108. The capacitor 406 is charged to the voltage present on the power terminal 102. Absent the overshoot, the voltage on the node 405 stays relatively constant due to the limited current flow through the resistor 404, thus a stable voltage reference is provided at the node 405, which can represent the DC bias source of FIG. 3. The voltage difference between the node 405 and the power terminal 102 (and the source-gate voltage of the transistor 408) is almost zero, which can disable the transistor 408 and allow the resistor 314 to pull down the voltage of the control terminal of the transistor 304 and turn off the transistor 304, as described above. Accordingly, the pull-up path on the control terminal of the high-side transistor 104 is disabled, which allows the high side gate driver 112 to control the high-side transistor 104 to perform the switching operations.

As the voltage on the power terminal 102 (and the source of the transistor 408) increases when the high-side transistor 104 is turning off, and the stable voltage of the node 405 (and the gate of the transistor 408), the source-gate voltage of the transistor 408 increases, and the transistor 408 turns on. Current flowing through the transistor 408 produces a voltage across the resistor 314 that turns on the transistor 304 and delays the turn off of the high-side transistor 104.

The transistor 410 limits the voltage at the control terminal of the transistor 304 to no less than a diode drop. The transistor 410 can be an NFET. A first current terminal (e.g., drain) of the transistor 410 is coupled to the control terminal of the transistor 304. A second current terminal (e.g., source) of the transistor 410 and a control terminal (e.g., gate) of the transistor 410 are coupled to the ground terminal.

The path from the power terminal 102 to the transistor 304 via the capacitor 308, and the path from the switching terminal 110 to the transistor 304 via the capacitor 310 provide faster response to overshoot on the power terminal 102 than the path through the transistor 408. Accordingly, the high-side ringing control circuit 114 reduces the time to clamp the voltage across the high-side transistor 104, reduces the overshoot on the power terminal 102, and reduces the potential for damage to the high-side transistor 104 relative to other clamping circuits.

Figure 5:
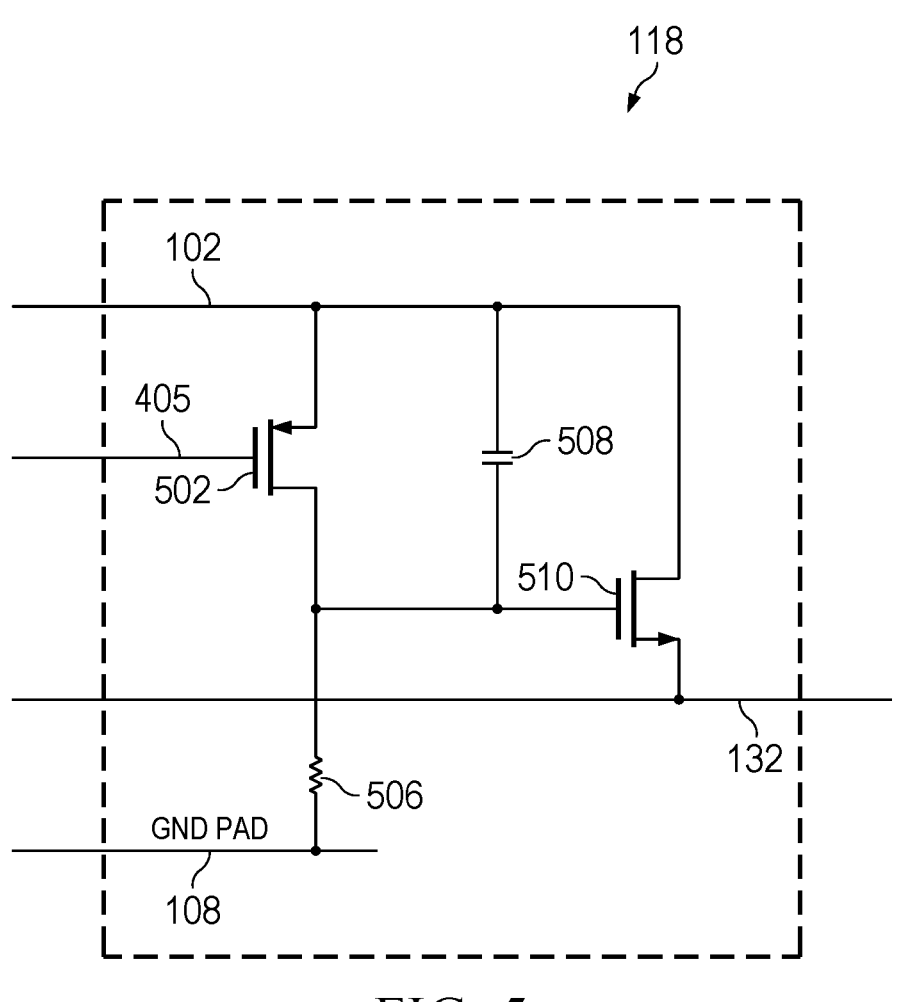
FIG. 5 is a schematic of an example low-side ringing control circuit that can be part of the DC-DC convert circuit of FIG. 1.

FIG. 5 is a schematic of an example low-side ringing control circuit 118. The low-side ringing control circuit 118 includes a transistor 502, a resistor 506, a capacitor 508, and a transistor 510. The transistor 510 is coupled between the power terminal 102 and the control terminal of the low-side transistor 106. The transistor 510 can be an NFET. A first current terminal (e.g., drain) of the transistor 510 is coupled to the power terminal 102, and a second current terminal (e.g., source) of the transistor 510 is coupled to the control terminal of the low-side transistor 106. The capacitor 508 and the resistor 506 form a high-pass filter (e.g., the high-pass filter 210). The capacitor 508 is coupled between the power terminal 102 and the control terminal of the transistor 510. In some examples, the capacitor 508 can be coupled between the switching terminal 110 and the control terminal of the transistor 510. The resistor 506 is coupled between the ground terminal 108 and the control terminal of the transistor 510. When the voltage on the power terminal 102 rises, the transient on the power terminal 102 passes through the capacitor 508 to turn on the transistor 510. The transistor 510 conducts current from the power terminal 102 to charge up and raise the voltage of the control terminal of the low-side transistor 106, which turns on the low-side transistor 106.

The transistor 502 is coupled between the power terminal 102 and the control terminal of the transistor 510. The transistor 502 can be a PFET. A first current terminal (e.g., source) of the transistor 502 is coupled to the power terminal 102, and a second current terminal (e.g., drain) of the transistor 502 is coupled to the control terminal of the transistor 510. A control terminal (e.g., gate) of the transistor 502 is coupled to a DC bias source or voltage reference. In some examples, that DC bias source/voltage reference can be provided by the node 405 of FIG. 4. In some examples, low-side ringing control circuit 118 can include a resistor and a capacitor coupled in series between the power terminal 102 and the ground terminal 108 similar to resistor 404 and capacitor 406 to provide the DC bias source/voltage reference.

As the voltage on the power terminal 102 increases, and a stable voltage reference is provided at the control terminal of the transistor 502, the source-gate voltage of the transistor 502 increases, and the transistor 502 turns on. Current flowing through the transistor 502 produces a voltage across the resistor 506 that turns on the transistor 510 and delays the turn off of (or turns on) the low-side transistor 106. Accordingly, a current path is provided between the power terminal 102 and the ground terminal 108 via the high-side transistor 104 and the low-side transistor 106 to discharge the power terminal 102, which can clamp the voltage across the low-side transistor 106.

Figure 6:
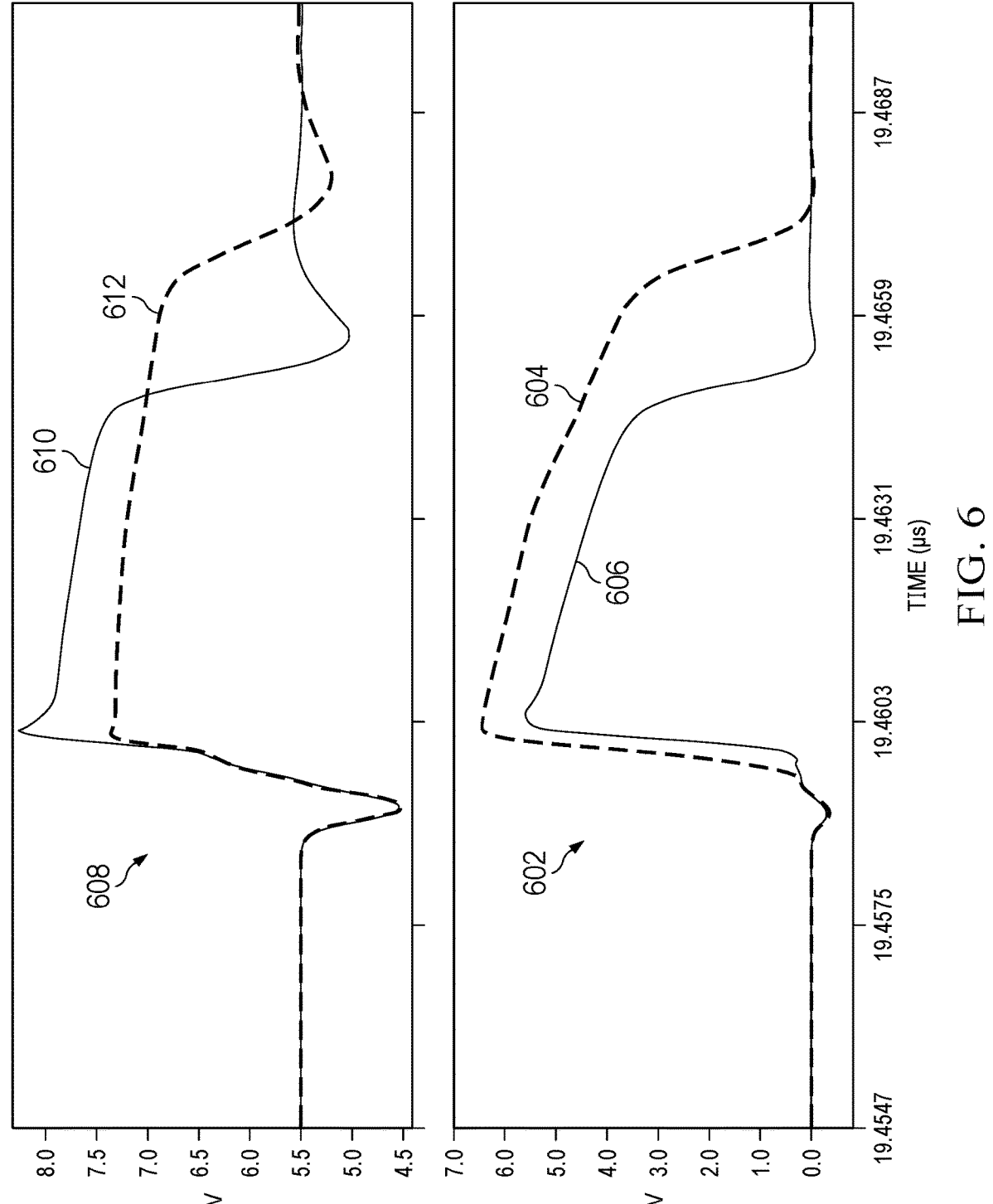
FIGS. 6-8 are graphs of example signals illustrating operation of the ringing control circuits in the DC-DC converter of FIG. 1.

FIG. 6 is a graph of signals in the high-side ringing control circuit 114 compared to signals in a ringing control circuit that lacks the high-pass filter 208 and the high-pass filter 210. The graph 602 compares the voltage at the control terminal of the transistor 304, at turn-off of the high-side transistor 104, with and without the high-pass filter 208 and the high-pass filter 210. The signal 606 is voltage at the control terminal of the transistor 304 without the high-pass filter 208 and the high-pass filter 210. The signal 604 is voltage at the control terminal of the transistor 304 with the high-pass filter 208 and/or the high-pass filter 210. The graph 608 compares the voltage at the power terminal 102, at turn-off of the high-side transistor 104, with and without the high-pass filter 208 and the high-pass filter 210. The signal 610 is voltage (overshoot) on the power terminal 102 without the high-pass filter 208 and the high-pass filter 210. The signal 612 is voltage on the power terminal 102 with the high-pass filter 208 and/or the high-pass filter 210.

The graph 602 shows that the high-pass filter 208 and/or the high-pass filter 210 enable earlier turn on the transistor 304, and accordingly, earlier clamping of the power terminal 102. The graph 608 shows that with the high-pass filter 208, and/or the high-pass filter 210, the power terminal 102 is clamped to a lower voltage than without the high-pass filter 208 and the high-pass filter 210, which better protects the high-side transistor 104.

Figure 7:
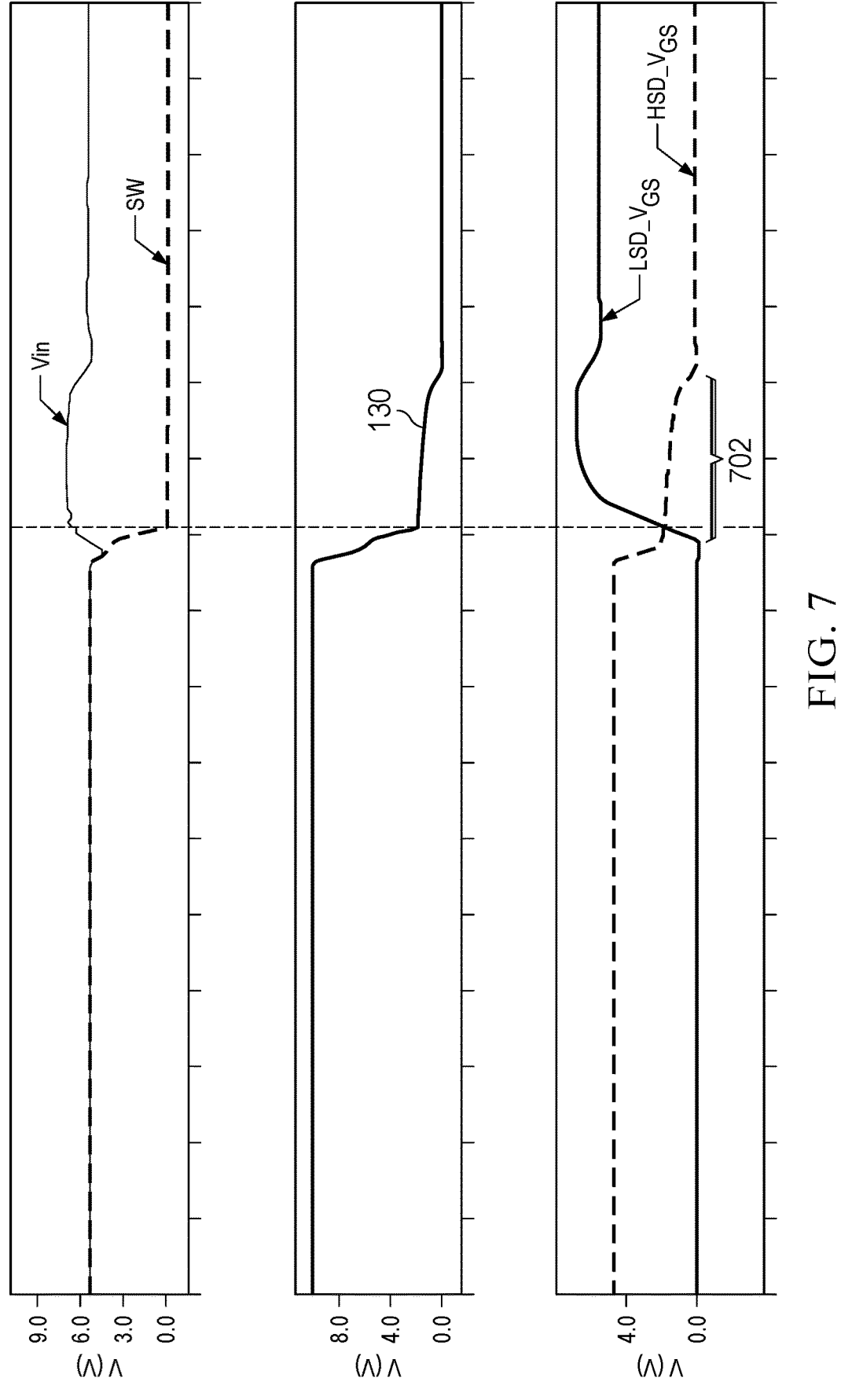

FIG. 7 is a graph of example signals in the DC-DC converter circuit 100 during turn-off of the high-side transistor 104. FIG. 7 shows the voltage (Vin) on the power terminal 102, the voltage (SW) on the switching terminal 110, the output signal 130 at the control terminal of the high-side transistor 104, the gate-source voltage (HSD_V$_{GS}$) of the high-side transistor 104, and the gate-source (LSD_V$_{GS}$) voltage of the low-side transistor 106 at turn off of the high-side transistor 104 and turn-on of the low-side transistor 106. In the interval 702, the high-side ringing control circuit 114 slows the transition of output signal 130 to delay turn-off of the high-side transistor 104, clamp Vin, and protect the high-side transistor 104.

Figure 8:
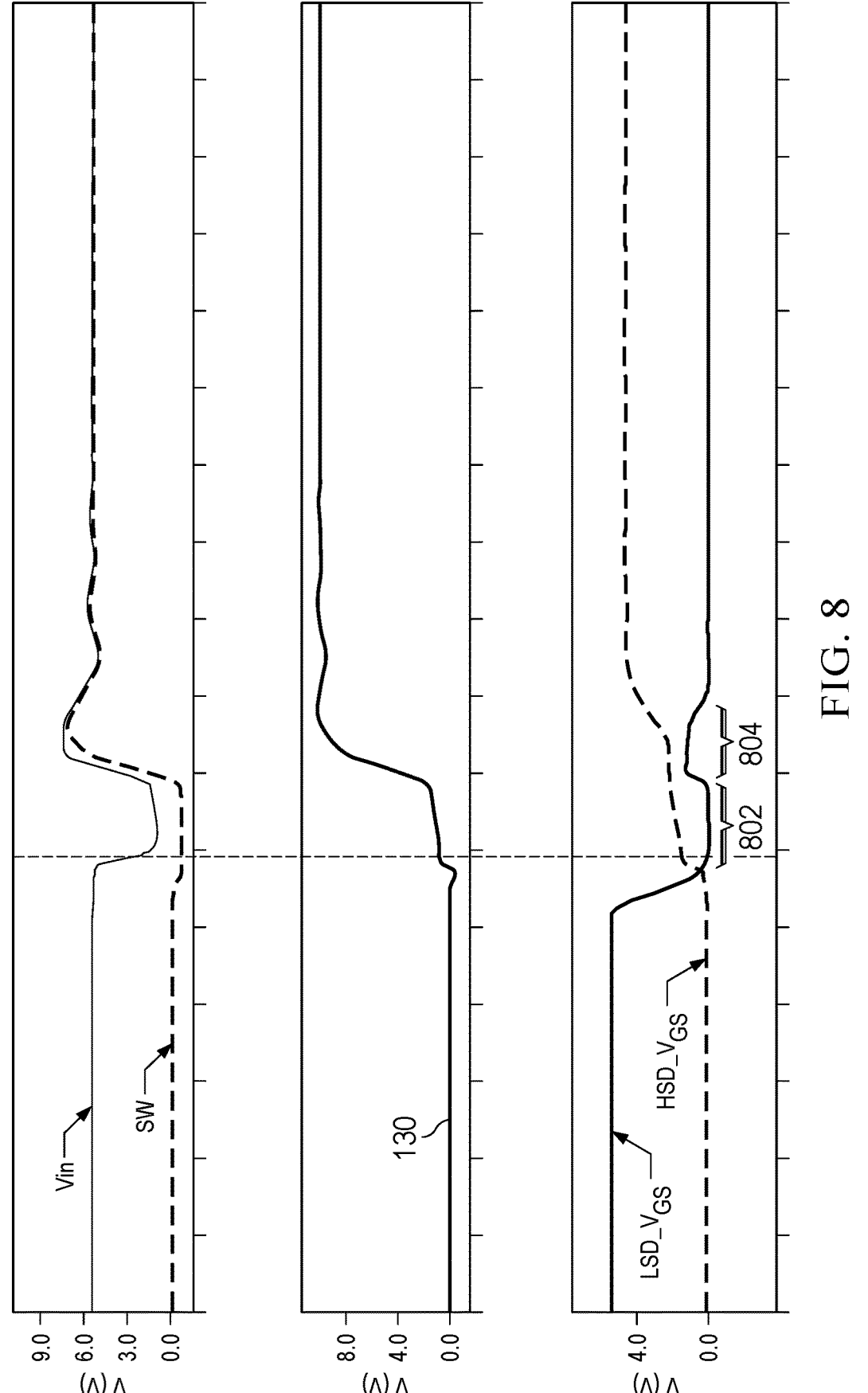

FIG. 8 is a graph of example signals in the DC-DC converter circuit 100 during turn-off of the low-side transistor 106. FIG. 8 shows the voltage (Vin) on the power terminal 102, the voltage (SW) on the switching terminal 110, the output signal 130 at the control terminal of the high-side transistor 104, the gate-source voltage (HSD_V$_{GS}$) of the high-side transistor 104, and the gate-source (LSD_V$_{GS}$) voltage of the low-side transistor 106 at turn off of the low-side transistor 106 and turn-on of the high-side transistor 104. In the interval 802, the low-side transistor 106 is off, the output signal 130 starts to rise, and the high-side transistor 104 is turning on. Vin drops as current starts to flow through the high-side transistor 104, and Vin rises (with overshoot) as the current flowing through the high-side transistor 104 stabilizes. Responsive to the rising edge of Vin, the low-side ringing control circuit 118 increases LSD_V$_{GS}$ in the interval 804 to turn on the low-side transistor 106 and clamp the voltage at the switching terminal 110 and protect the low-side transistor 106.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) (n-type transistor) or a p-channel FET (PFET)) (p-type transistor)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input (or transistor control terminal) is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit, comprising:
   a transistor coupled between a power terminal and a switching terminal, the transistor including a control terminal coupled to a driver output; and a ringing control circuit having a control input and a control output, in which the control input is coupled to the switching terminal, and the control output is coupled to the control terminal.

2. The circuit of claim 1, wherein the ringing control circuit includes a capacitor coupled between the control input and the control output.

3. The circuit of claim 2, wherein the control input is a first control input, the transistor is a first transistor, the control terminal is a first control terminal, the ringing control circuit has a second control input, and the ringing control circuit includes a second transistor coupled between the second control input and the control output, the second transistor having a second control terminal; and
   wherein the capacitor is coupled between the first control input and the second control terminal.

4. The circuit of claim 3, wherein the second control input is coupled to the power terminal, the capacitor is a first capacitor, and the ringing control circuit further includes a second capacitor coupled between the second control input and the second control terminal.

5. The circuit of claim 3, further comprising a third transistor coupled between the second control input and the second control terminal, the third transistor having a third control terminal,
   wherein the capacitor is coupled between the first control input and the third control terminal.

6. The circuit of claim 5, wherein the third transistor is a p-type transistor.

7. The circuit of claim 5, wherein the capacitor is a first capacitor, and the ringing control circuit includes: a resistor coupled between the second control input and the third control terminal, and a second capacitor coupled between the third control terminal and a ground terminal.

8. The circuit of claim 7, wherein the resistor is a first resistor, and the ringing control circuit includes:
   a fourth transistor coupled between the second control input and the second control terminal, the fourth transistor having a fourth control terminal coupled to the third control terminal; and
   a second resistor coupled between the second control terminal and the ground terminal.

9. The circuit of claim 8, wherein the ringing control circuit includes a diode coupled between the second control terminal and the ground terminal.

10. The circuit of claim 3, wherein the ringing control circuit includes a diode coupled between the second transistor and the first control terminal.

11. A circuit comprising:
   a transistor coupled between a switching terminal and a ground terminal, the transistor having a control terminal coupled to a driver output; and
   a ringing control circuit having a control input and a control output, in which the control input is coupled to a power terminal, and the control output is coupled to the control terminal.

12. The circuit of claim 11, wherein the ringing control circuit includes a capacitor coupled between the control input and the control output.

13. The circuit of claim 12, wherein the transistor is a first transistor, the control terminal is a first control terminal, and the ringing control circuit includes a second transistor coupled between the control input and the control output, the second transistor having a second control terminal; and
   wherein the capacitor is coupled between the control input and the second control terminal.

14. The circuit of claim 13, wherein the capacitor is a first capacitor, and the ringing control circuit includes: a resistor coupled between the control input and the second control terminal, and a second capacitor coupled between the second control terminal and the ground terminal.

15. The circuit of claim 14, wherein the resistor is a first resistor, and the ringing control circuit includes:

a third transistor coupled between the control input and the second control terminal, the third transistor having a third control terminal, in which the first resistor is coupled between the control input and the third control terminal; and a second resistor coupled between the second control terminal and the ground terminal.

16. A circuit comprising:

a high-side transistor coupled between a power terminal and a switching terminal, the high-side transistor including a high-side control terminal;

a low-side transistor coupled between the switching terminal and a ground terminal, the low-side transistor including a low-side control terminal;

a high-side driver having a high-side input and a high-side output, in which the high-side output is coupled to the high-side control terminal;

a low-side driver having a low-side input and a low-side output, in which the low-side output is coupled to the low-side control terminal; and a ringing control circuit having a control input and a control output, in which the control input is coupled to one of the switching terminal or the power terminal, and the control output is coupled to one of the high-side control terminal or the low-side control terminal.

17. The circuit of claim 16, wherein the ringing control circuit includes a capacitor coupled between the control input and the control output.

18. The circuit of claim 17, wherein the capacitor is a first capacitor, the control input is a first control input, the ringing control circuit has a second control input coupled to one of the power terminal, and the ringing control circuit includes a second capacitor coupled between the second control input and the control output.

19. The circuit of claim 16, wherein the control input is coupled to the power terminal, and the control output is coupled to the low-side control terminal.

20. The circuit of claim 19, wherein the ringing control circuit is a high-side ringing control circuit having the control input coupled to the switching terminal and the control output coupled to the high-side control terminal, and the circuit further comprises a low-side ringing control circuit having the control input coupled to the power terminal and the control output coupled to the low-side control terminal.

* * * * *